United States Patent
Lee et al.

(10) Patent No.: US 9,542,338 B2
(45) Date of Patent: Jan. 10, 2017

(54) CONTROLLING APPLICATIONS ACCORDING TO CONNECTION STATE AND EXECUTION CONDITION

(71) Applicant: KT CORPORATION, Gyeonggi-do (KR)

(72) Inventors: Jung-Wook Lee, Gyeonggi-do (KR); Shin-Hyuk Kang, Seoul (KR); You-Jin Kang, Seoul (KR); Jung-Suk Park, Seoul (KR); Ji-Yong Ahn, Seoul (KR); Jae-Hun Jung, Gyeonggi-do (KR); Jae-Uk Cha, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 13/726,361

(22) Filed: Dec. 24, 2012

(65) Prior Publication Data

US 2013/0166790 A1 Jun. 27, 2013

(30) Foreign Application Priority Data

Dec. 23, 2011 (KR) .................. 10-2011-0141654

(51) Int. Cl.
G06F 13/10 (2006.01)
(52) U.S. Cl.
CPC .............. *G06F 13/10* (2013.01); *G06F 13/105* (2013.01)
(58) Field of Classification Search
None
See application file for complete search history.

(56) References Cited

U.S. PATENT DOCUMENTS

| | | | |
|---|---|---|---|
| 5,832,471 A | * | 11/1998 | Fukui |
| 5,875,312 A | | 2/1999 | Walsh et al. |
| 6,286,066 B1 | | 9/2001 | Hayes et al. |
| 6,401,157 B1 | | 6/2002 | Nguyen et al. |
| 6,516,367 B1 | | 2/2003 | Barenys et al. |
| 6,535,947 B1 | | 3/2003 | Amoni et al. |
| 6,600,840 B1 | | 7/2003 | McCrossin et al. |
| 6,697,892 B1 | | 2/2004 | Laity et al. |
| 6,804,740 B1 | | 10/2004 | Watts, Jr. |

(Continued)

FOREIGN PATENT DOCUMENTS

| | | |
|---|---|---|
| JP | 2000-163361 A | 6/2000 |
| JP | 2003-316563 A | 11/2003 |

(Continued)

OTHER PUBLICATIONS

MS Office 2007: Turn alrt on or off; src: https://support.office.com/en-ie/article/Turn-Desktop-Alerts-on-or-off-a83fe224-3109-4de0-a1ab-c33fd103a422; obtained date: Jan. 15, 2015.

(Continued)

*Primary Examiner* — Idriss N Alrobaye
*Assistant Examiner* — Dayton Lewis-Taylor
(74) *Attorney, Agent, or Firm* — IP Legal Services, LLC

(57) ABSTRACT

The disclosure is related to controlling an application execution in user equipment. A user request for executing an application may be received. An execution condition may be obtained associated with the requested application. Whether the user equipment is connected to an external device may be detected. An execution of the requested application may be controlled based on a detection result and the obtained execution condition.

14 Claims, 8 Drawing Sheets

(56) References Cited

U.S. PATENT DOCUMENTS

| | | | |
|---|---|---|---|
| 6,862,724 | B1 | 3/2005 | Riley et al. |
| 6,915,368 | B2 | 7/2005 | Lin |
| 6,934,788 | B2 | 8/2005 | Laity et al. |
| 7,076,536 | B2 | 7/2006 | Chiloyan et al. |
| 7,117,388 | B2 | 10/2006 | Arimilli et al. |
| 7,165,109 | B2 | 1/2007 | Chiloyan et al. |
| 7,196,676 | B2 | 3/2007 | Nakamura et al. |
| 7,199,787 | B2 | 4/2007 | Lee et al. |
| 7,228,366 | B2 | 6/2007 | Abramson et al. |
| 7,266,779 | B2 | 9/2007 | Baek et al. |
| 7,312,764 | B2 | 12/2007 | Driver et al. |
| 7,386,868 | B2 | 6/2008 | McCormack |
| 7,533,408 | B1 | 5/2009 | Arnouse |
| 7,685,322 | B2 | 3/2010 | Bhesania et al. |
| 7,853,944 | B2 | 12/2010 | Choe |
| 7,884,836 | B2 | 2/2011 | Hussain |
| 8,214,545 | B2 | 7/2012 | Khan et al. |
| 8,250,277 | B2 | 8/2012 | Tseng et al. |
| 8,281,366 | B1 | 10/2012 | McCorkendale et al. |
| 2002/0083228 | A1 | 6/2002 | Chiloyan et al. |
| 2002/0121548 | A1 | 9/2002 | Lu |
| 2003/0231143 | A1 | 12/2003 | Nakamura et al. |
| 2004/0006690 | A1 | 1/2004 | Du et al. |
| 2004/0160193 | A1 | 8/2004 | Cha et al. |
| 2004/0210321 | A1 | 10/2004 | Hayashi et al. |
| 2004/0218036 | A1 | 11/2004 | Boss et al. |
| 2004/0257385 | A1 | 12/2004 | Kim et al. |
| 2004/0266425 | A1 | 12/2004 | Gonsalves et al. |
| 2005/0068252 | A1 | 3/2005 | Driver et al. |
| 2005/0257052 | A1 | 11/2005 | Asai et al. |
| 2006/0036788 | A1 | 2/2006 | Galang et al. |
| 2006/0132473 | A1 | 6/2006 | Fuller et al. |
| 2006/0190652 | A1 | 8/2006 | Keely et al. |
| 2007/0077965 | A1 | 4/2007 | Fox |
| 2007/0171239 | A1 | 7/2007 | Hunt et al. |
| 2007/0239844 | A1 | 10/2007 | Yokoyama et al. |
| 2007/0245398 | A1 | 10/2007 | Roden |
| 2007/0257927 | A1 | 11/2007 | Sakanishi et al. |
| 2008/0144051 | A1 | 6/2008 | Voltz et al. |
| 2008/0152305 | A1 | 6/2008 | Ziegler |
| 2008/0225013 | A1 | 9/2008 | Muylkens et al. |
| 2008/0303746 | A1 | 12/2008 | Schlottmann et al. |
| 2009/0049554 | A1 | 2/2009 | Vuong et al. |
| 2009/0109822 | A1 | 4/2009 | Hung |
| 2009/0163139 | A1 | 6/2009 | Wright-Riley |
| 2009/0178097 | A1 | 7/2009 | Kim et al. |
| 2009/0231485 | A1 | 9/2009 | Steinke |
| 2010/0064228 | A1 | 3/2010 | Tsern |
| 2010/0064248 | A1 | 3/2010 | Lee et al. |
| 2010/0066698 | A1 | 3/2010 | Seo |
| 2010/0153501 | A1 | 6/2010 | Gabriel et al. |
| 2010/0251243 | A1 | 9/2010 | Gill et al. |
| 2010/0265652 | A1 | 10/2010 | Agata et al. |
| 2010/0318709 | A1 | 12/2010 | Bell et al. |
| 2011/0034242 | A1 | 2/2011 | Aronzon et al. |
| 2011/0037711 | A1 | 2/2011 | Siddiqui et al. |
| 2011/0083140 | A1 | 4/2011 | Kim et al. |
| 2011/0098087 | A1* | 4/2011 | Tseng ............................ 455/557 |
| 2011/0102554 | A1 | 5/2011 | Saito et al. |
| 2011/0134047 | A1 | 6/2011 | Wigdor et al. |
| 2011/0138327 | A1 | 6/2011 | Scott et al. |
| 2011/0202872 | A1 | 8/2011 | Park |
| 2011/0275391 | A1 | 11/2011 | Lee et al. |
| 2011/0285916 | A1 | 11/2011 | Takiduka |
| 2011/0296308 | A1 | 12/2011 | Yi |
| 2011/0306389 | A1 | 12/2011 | Nagayama |
| 2012/0011451 | A1 | 1/2012 | Bansal et al. |
| 2012/0050183 | A1* | 3/2012 | Lee ............................... 345/173 |
| 2012/0050331 | A1 | 3/2012 | Kanda |
| 2012/0062479 | A1 | 3/2012 | Feldstein et al. |
| 2012/0088548 | A1* | 4/2012 | Yun et al. ..................... 455/557 |
| 2012/0117167 | A1 | 5/2012 | Sadja et al. |
| 2012/0155325 | A1 | 6/2012 | Eichen et al. |
| 2012/0155454 | A1 | 6/2012 | Eichen et al. |
| 2012/0172088 | A1 | 7/2012 | Kirch et al. |
| 2012/0280907 | A1 | 11/2012 | Masaki et al. |
| 2012/0297207 | A1 | 11/2012 | Carlsen et al. |
| 2012/0324041 | A1 | 12/2012 | Gerber et al. |
| 2013/0033414 | A1 | 2/2013 | Zheng et al. |
| 2013/0089202 | A1 | 4/2013 | Altmann |
| 2013/0104149 | A1 | 4/2013 | Ahn et al. |
| 2014/0208276 | A1 | 7/2014 | Park |

FOREIGN PATENT DOCUMENTS

| | | | |
|---|---|---|---|
| JP | 2005-284657 | A | 10/2005 |
| JP | 2006-094367 | A | 4/2006 |
| JP | 2008-158342 | A | 7/2008 |
| JP | 2011-142392 | A | 7/2011 |
| JP | 2011-259253 | A | 12/2011 |
| KR | 20-0290286 | Y1 | 9/2002 |
| KR | 10-2004-0074759 | A | 8/2004 |
| KR | 10-2005-0015125 | A | 2/2005 |
| KR | 10-0487618 | B1 | 5/2005 |
| KR | 10-2005-0096578 | A | 10/2005 |
| KR | 10-2006-0018083 | A | 2/2006 |
| KR | 10-2008-0027813 | A | 3/2008 |
| KR | 10-2009-0092337 | A | 8/2009 |
| KR | 10-2010-0032660 | A | 3/2010 |
| KR | 10-2010-0039592 | A | 4/2010 |
| KR | 10-2010-0108885 | A | 10/2010 |
| KR | 20-2010-0009920 | U | 10/2010 |
| KR | 10-2010-0128630 | A | 12/2010 |
| KR | 10-2010-0133243 | A | 12/2010 |
| KR | 10-2011-0030963 | A | 3/2011 |
| KR | 10-1017866 | B1 | 3/2011 |
| KR | 10-2011-0057930 | A | 6/2011 |
| KR | 10-2011-0093541 | A | 8/2011 |
| KR | 10-2011-0111857 | A | 10/2011 |
| KR | 10-2011-0115489 | A | 10/2011 |
| KR | 10-2011-0123348 | A | 11/2011 |
| KR | 10-2011-0131439 | A | 12/2011 |
| KR | 10-2011-0134495 | A | 12/2011 |

OTHER PUBLICATIONS

Daniel Lawson NPL Oct. 2011—How to turn off notification; src: http://apple.stackexchange.com/questions/28883/how-can-i-turn-off-push-notifications-for-individual-apps-in-ios-5; obtained date: Aug. 26, 2014.

* cited by examiner

CONTROLLING APPLICATIONS ACCORDING TO CONNECTION STATE AND EXECUTION CONDITION

CROSS-REFERENCE TO PRIOR APPLICATIONS

The present application claims priority under 35 U.S.C. §119 to Korean Patent Application No. 10-2011-0141654 (filed on Dec. 23, 2011), which is hereby incorporated by reference in its entirety.

The subject matter of this application is related to U.S. patent application Ser. No. 13/540,112 filed Jul. 2, 2012, U.S. patent application Ser. No. 13/539,929 filed Jul. 2, 2012, U.S. patent application Ser. No. 13/460,091 filed Apr. 30, 2012, U.S. patent application Ser. No. 13/598,741 filed Aug. 30, 2012, U.S. patent application Ser. No. 13/726,811 filed Dec. 26, 2012, as U.S. patent application Ser. No. 13,726,830 filed Dec. 26, 2012, U.S. patent application Ser. No. 13/726,384 filed Dec. 24, 2012, U.S. patent application Ser. No. 13,726,404 filed Dec. 24, 2012, and U.S. patent application Ser. No. 13,726,422 filed Dec. 24, 2012, the teachings of which are incorporated herein their entirety by reference.

FIELD OF THE INVENTION

The present invention relates to user equipment and, in particular, to controlling execution of applications according to a connection state of user equipment and an execution condition set to a corresponding application.

BACKGROUND OF THE INVENTION

User equipment has advanced so as to perform multiple functions such as communicating voice and data with others; exchanging text messages or multimedia messages; sending e-mails; capturing a still or moving image; playing back a music or a video file, playing a game, and a receiving a broadcast signal. Lately, such multi-functional user equipment has received greater attention for new applications. Instead of using multiple independent devices, a user prefers to use single multifunction-enabled user equipment. Portability and/or mobility should be considered in design of user equipment, but such user equipment has limitations in size. Accordingly, there also are limitations in display screen size, screen resolution, and speaker performance. In order to overcome such limitations, an external device having a large display size, better speaker performance, and connectable to a mobile terminal has been introduced. Such external device connected to the mobile terminal can provide data, music files, and other content stored in the mobile terminal in better performance. Lately, various types of applications for controlling a coupled external device have been introduced. Such applications might not need to be performed when user equipment is not coupled to an external device. Furthermore, an application for utilizing features of user equipment in a standalone mode might not need to be performed when user equipment is coupled to an external device. Such applications for a coupled external device and applications for user equipment in standalone mode might need to be controlled differently according to a connection state between the user equipment and the external device.

SUMMARY OF THE INVENTION

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, user equipment may control at least one of applications based on a connection state between the user equipment and an external device and at least one execution condition set to a corresponding application.

In accordance with another aspect of the present invention, user equipment may control display of application icon based on a connection state of the user equipment, execution conditions, and information on user equipment or external device.

In accordance with an embodiment of the present invention, a method may be provided for controlling an application execution in user equipment. The method may include receiving a user request for executing an application, obtaining an execution condition associated with the requested application, detecting whether the user equipment is connected to an external device, and controlling an execution of the requested application based on a detection result and the obtained execution condition.

The method may further include setting at least one execution condition associated with at least one application installed in the user equipment.

The execution condition may include at least one of a standalone execution condition, a disconnected execution condition, and a device-related execution condition.

The execution conditions associated with an application may be included in an installation file of the application when the application is installed in the user equipment.

An application set with the standalone execution condition may be allowed to be executed when the user equipment is not coupled to an external device. An application set with the disconnected execution condition may be allowed to be executed when the user equipment is coupled to an external device. An application set with the device-related execution condition may be allowed to be executed when the device-related execution condition satisfies with at least one property of one of the user equipment and the external device.

The controlling may include controlling the external device to display an execution result of the requested application, when the user equipment is connected to the external device and the requested application is set with the connected execution condition.

The performing may include controlling the external device not to display an execution result of the requested application, when the user equipment is connected to the external device and the requested application is set with the standalone execution condition.

The performing may include restricting execution of the requested application, when the user equipment is disconnected from the external device and the requested application is set to the connected control condition.

The performing may include allowing execution of the requested application when the user equipment is disconnected from the external device and the requested application is set with the standalone execution control.

In accordance with another embodiment of the present invention, a method may be provided for controlling execution of respective applications through controlling display of associated icons. The method may include obtaining execution conditions associated with at least one application installed in the user equipment, detecting whether the user equipment is connected to an external device, determining an executable application based on the obtained execution conditions and a detection result, and displaying an icon associated with the determined executable application.

The execution conditions may include one of a standalone execution condition and a disconnected execution condition and a device-related execution condition.

An application set with the standalone execution condition is allowed to be executed when the user equipment is not coupled to an external device. An application set with the disconnected execution condition is allowed to be executed when the user equipment is coupled to an external device. An application set with the device-related execution condition is allowed to be executed when the device-related execution condition satisfies with at least one property of one of the user equipment and the external device.

The method may include determining an application set with the connected execution condition as the executable application when the user equipment is connected to the external device, and displaying an icon of the determined executable application through the external device.

The method may include determining an application set with the standalone execution condition as the executable application when the user equipment is disconnected from the external device, and displaying an icon of the determined executable application on the user equipment.

The determining may further include, when device information on at least one of the external device and the user equipment is obtained according to the detection result, determining whether the device-related execution condition is satisfied based on the obtained device information.

The information may include at least one of a device type and a screen size.

In accordance with still another embodiment of the present invention, method may be provided for user equipment for controlling execution of an application. The user equipment may include a sensing unit and an application control unit. The sensing unit may be configured to detect whether the user equipment is connected to an external device. An application control unit may be configured to control execution of at least one of an application and display of an icon of an installed application, based on a detection result of the sensing unit and at least one execution condition associated with the installed application.

The execution condition may include at least one of a standalone execution condition, a disconnected execution condition, and a device-related execution condition.

The application control unit may include an execution control unit configured to receive a user request for executing the installed application, to obtain the execution condition associated with the requested application, and to control execution of the application based on the detection result and the obtained execution condition.

The application control unit may include a user interface (UI) control unit configured to obtain the execution condition associated with the installed application, to determine an executable application based on the obtained execution condition and the detection result, and to display an icon associated with the determined executable application, through a corresponding device determined according to the detection result.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
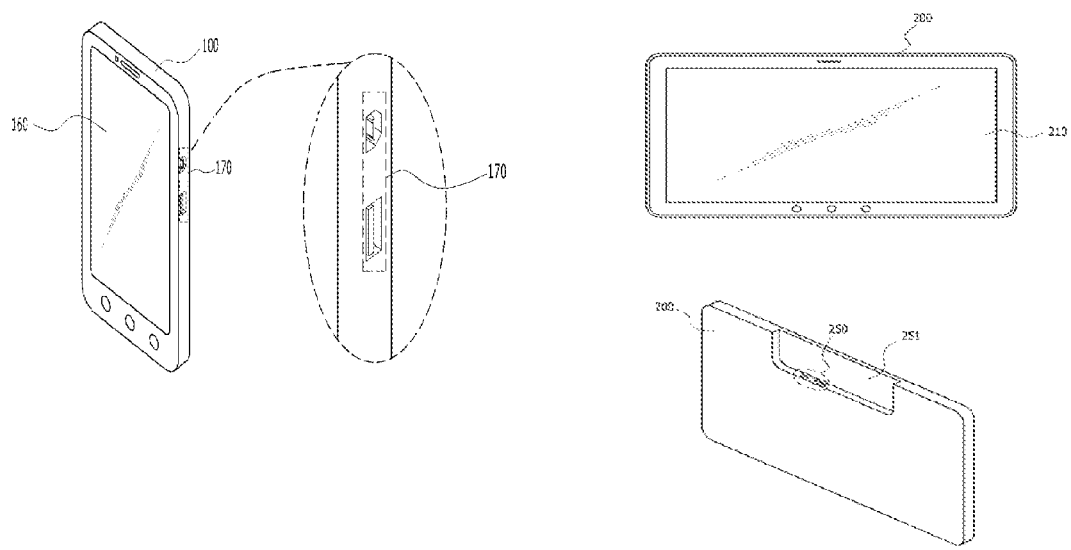
FIG. 1 shows user equipment and an external device in accordance with at least one embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment of the present invention, user equipment may control at least one of applications based on a connection state between the user equipment and an external device and at least one execution condition set to a corresponding application. For example, an application designed for a coupled extern device and an application designed for user equipment in a standalone mode may be controlled differently. Before describing such operation, user equipment and a connectable external device will be described with reference to FIG. 1A to FIG. 5.

FIG. 1A shows user equipment 100 and FIG. 1B shows an external device 200 in accordance with at least one embodiment of the present invention.

Referring to FIG. 1A, user equipment 100 may include display unit 160 and at least one port unit 170. Display unit 160 may display data according to display setting of user equipment 100. Display unit 160 may typically have about 4.5 inch display area which is smaller than that of external device 200 (FIG. 1B), but the present invention is not limited thereto. For example, a display area of external device 200 may be smaller than that of user equipment 100. At least one port unit 170 may be coupled to external device 200 and exchange data. User equipment 100 may be capable of processing data, displaying the processed data on display unit 160, and transferring the processed data to an external device through port unit 170. Particularly, user equipment 100 may process image data corresponding to a display setting of display unit 160 and display the processed image data on display unit 160. In accordance with at least one embodiment of the present invention, user equipment 100 may be capable of i) adjusting the processed image data according to a display setting of external device 200, ii) transferring the adjusted image data to external device 200 through the at least one port unit 170, and iii) controlling the display unit of external device to display the adjusted image data. As described above, user equipment 100 may include at least one port unit 170. Such a port unit 170 may include a high definition multimedia interface (HDMI) port and/or a universal serial bus (USB) port, but the present invention is not limited thereto. User equipment 100 may have a certain design or standardized interface connectable to external device 200. For example, user equipment 100 may be attachable to and/or detachable with a cable or wireless radio from external device 200. User equipment 100 may dock to external device 200. User equipment 100 may be any electronic device that can perform the above and further operations described herein. For example, user equipment 100 may include, but is not limited to, a mobile terminal, a mobile device, a mobile phone, a portable terminal, a portable device, a handheld device, a cellular phone, a smart phone, a personal digital assistant (PDA), wireless local loop (WLL) station, a portable multimedia player (PMP), and a navigation device. The present invention, however, is not limited thereto, and other types of user equipment, such as mini-laptop PCs and other computing devices may incorporate embodiments of the present invention. User equipment 100 will be described in more detail with reference to FIG. 4.

As shown in FIG. 1B, external device 200 may include display unit 210 and at least one port unit 250. Display unit 210 may display data. Display unit 210 may have a display area larger than that of user equipment 100. For example, display unit 210 may have about 10.1 inch of display area. The present invention, however, is not limited thereto. External device 200 may have a display area smaller than that of user equipment 100. At least one port unit 250 may be coupled to corresponding port unit 170 of user equipment 100 for exchanging data with user equipment 100. Accordingly, at least one port unit 250 may include a HDMI port and/or a USB port corresponding to port unit 170 of user equipment 100. External device 200 may be capable of receiving data from user equipment 100 through at least one port unit 250 and displaying the received data on display unit 210. External device 200 may have a certain design connectable to user equipment 100 through at least one port unit 250. For example, external device 200 may be attachable to and/or detachable from user equipment 100 as described above with respect to FIG. 1A. External device 200 may have a structure for receiving and holding user equipment 100. Such a structure may be referred to as coupling bay 251. External device 200 may be any electronic device that can perform the above operation. For example, external device 200 may include a notebook computer, a laptop computer, a tablet PC, a pad having a touch screen, and a pad having a display unit and a keyboard, but the present invention is not limited thereto. In accordance with at least one embodiment of the present invention, external device 200 may be activated when user equipment 100 is connected to external device 200 and controlled by user equipment 100. Accordingly, external device 200 may have at least constituent elements for necessary operation performed under the control of user equipment 100.

As described above, user equipment 100 may be coupled to external device 200. For example, at least one port unit 170 of user equipment 100 may be coupled to at least one port unit 250 of external device 200. In accordance with at least one embodiment of the present invention, user equipment 100 may be coupled to external device 200 in a docking manner. Such coupling manner will be described with reference to FIG. 2.

Figure 2:
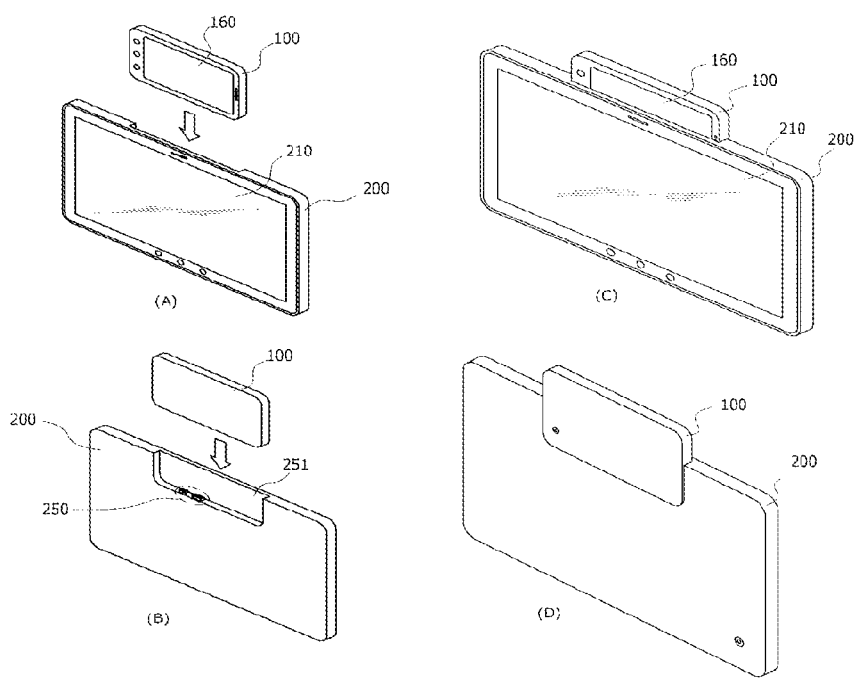
FIG. 2 shows user equipment coupled to an external device in accordance with at least one embodiment of the present invention.

FIG. 2 shows user equipment coupled to an external device in accordance with at least one embodiment of the present invention.

Referring to FIG. 2, user equipment 100 may be inserted in coupling bay 251 of external device 200 in a top-to-bottom direction as shown in a diagram (A). As shown in diagram (B), display unit 160 of user equipment 100 and display unit 210 of external device 200 may face the same direction while user equipment 100 is inserted into coupling bay 251 of external device 200. As shown in diagram (C), user equipment 100 may be completely inserted into coupling bay 251 of external device 200 until at least one port unit 170 of user equipment 100 is interlocked to at least one port unit 250 of external device 200. Although FIG. 2 shows that user equipment 100 is coupled with external device 200 in a docking manner, the present invention is not limited thereto. User equipment 100 may be coupled to external device 200 in other manners.

Figure 3:
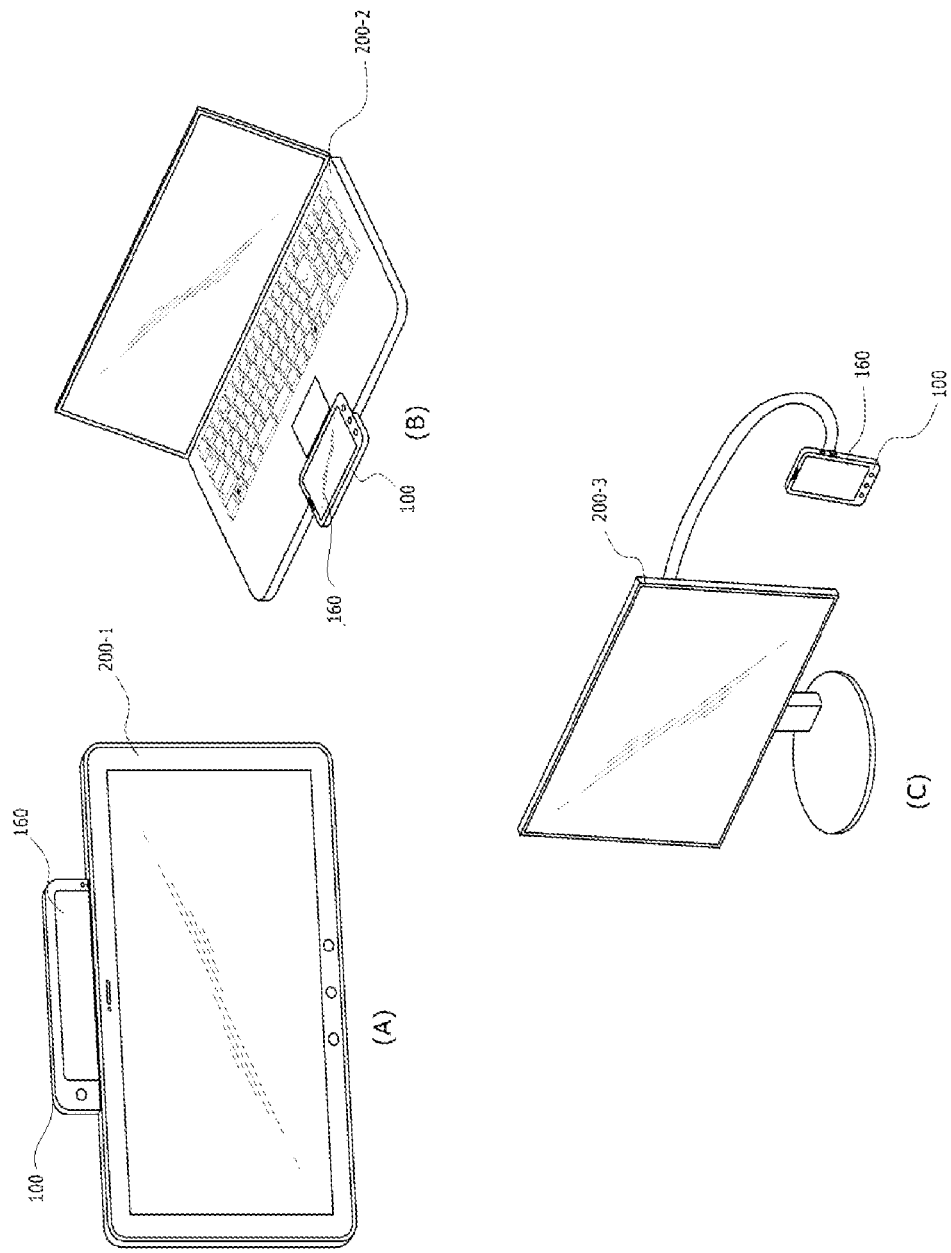
FIG. 3 shows various coupling manners of user equipment and various types of external devices connected to the user equipment.

FIG. 3 shows various coupling manners of user equipment and various types of external devices connected to the user equipment.

Referring to FIG. 3, user equipment 100 may be coupled to a pad type device 200-1 in a docking manner as show in a diagram (A). Furthermore, user equipment 100 may be coupled to a laptop computer 200-2 in a docking manner as show in a diagram (B). User equipment 100 may be coupled to a monitor 200-3 through a physical cable as shown in a diagram (C).

As shown, user equipment 100 may be coupled to external device 200 in various manners. After user equipment 100 is coupled to external device 200, user equipment 100 may exchange data with external device 200 through port units 170 and 250. In accordance with at least one embodiment of the present invention, user equipment 100 may control external device 200 by exchanging data through a communication link formed between port unit 170 of user equipment 100 and port unit 250 of external device 200. Particularly, user equipment 100 may adjust image data according to a display setting of display unit 210 of external device 200, transfer the adjusted image data to external device 200 through port units 170 and 250, and control display unit 210 of external device 200 to display the adjusted image data in accordance with an embodiment of the present invention.

Furthermore, user equipment 100 may be connected to various types of external devices such as pad type external device 200-1, laptop computer 200-2, and monitor 200-3. Such external devices may also include a game device, a navigation system, and a television set (TV). Each external device may have different constituent elements with unique properties.

Hereinafter, user equipment 100 will be described in more detail with reference to FIG. 4. As described above, user equipment 100 may be coupled to various types of external devices including external device 200 and control the connected external device in accordance with at least one embodiment of the present invention. Particularly, user equipment 100 may determine an application tailored for optimally controlling and driving constituent elements of the connected external device and transmit the operation results of the tailored application to the connected external device in accordance with an embodiment of the present invention.

Figure 4:
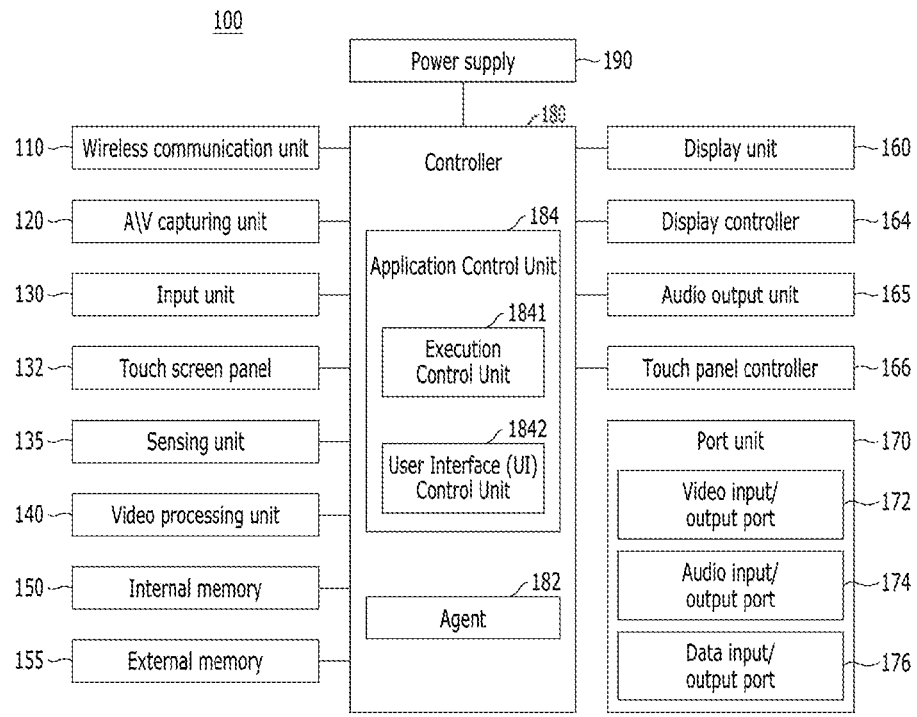
FIG. 4 is a block diagram illustrating user equipment in accordance with at least one embodiment of the present invention.

FIG. 4 is a block diagram illustrating user equipment in accordance with at least one embodiment of the present invention.

Referring to FIG. 4, user equipment 100 may include wireless communication unit 110, audio/video (A/V) input unit 120, input unit 130, sensing unit 135, video processing unit 140, internal memory 150, external memory 155, display unit 160, display controller 164, audio output unit 165, touch panel controller 166, port unit 170, controller 180, and power supply 190. Input unit 130 may include touch screen panel 132. Controller 180 may include an agent 182. Port unit 170 may include video input/output port 172, audio input/output port 174, and data input/output port 176. Power supply unit 190 may include a battery for electric charging. User equipment 100 may be described as including the above constituent elements, but the present invention is not limited thereto.

Wireless communication unit 110 may include at least one module for communicating with other party through a wireless communication system. For example, wireless communication unit 110 may include any or all of a broadcasting signal receiving module, a mobile communication module, a wireless Internet module, a short-distance communication module, and a location information module. In accordance with at least one embodiment of the present invention, wireless communication unit 110 may be not an essential unit for user equipment 100 because user equipment 100 may be not required to communicate with another party. Accordingly, wireless communication unit 110 may be omitted in accordance with another embodiment of the present invention.

A/V capturing unit 120 may capture an audio signal and/or a video signal. For example, the A/V input unit 120 may include a camera and a microphone. The camera may process image frames of a still image or a moving image, which are captured by an image sensor in a video call mode or a photographing mode. The microphone may receive an audio signal provided externally in an on-call mode, a recording mode, or a voice recognition mode.

Input unit 130 may be a user interface for receiving input from a user. Such an input unit 130 may be realized in various types. For example, input unit 130 may include any of a keypad, a dome switch, a touch pad, a jog wheel, and a jog switch, but is not limited thereto.

In accordance with at least one embodiment of the present invention, user equipment 100 may be a full touch type smart phone. In this case, input unit 130 may include several hardware key buttons and a touch screen. The hardware key buttons may include a hold key and a volume control button. Touch screen panel 132 may be another input unit for receiving touch inputs in accordance with embodiments of the present invention. Touch screen panel 132 may be disposed on an upper surface of display unit 160, but the present invention is not limited thereto.

In accordance with at least one embodiment of the present invention, input unit 130 may be configured to receive selection inputs from a user for selecting at least one of applications. Further, input unit 130 may be configured to receive selection inputs from a user for selecting an execution condition (e.g., a standalone execution condition, a disconnected execution condition, and a device-related execution condition, etc.) of an application. For example, a user may make such selection inputs based on a graphic user interface (GUI) provided to the user through display unit 160. The GUI may be displayed with a list of applications installed in user equipment 100.

Sensing unit 135 may detect a current status of user equipment 100. For example, sensing unit 135 may sense an opening or closing of a cover of user equipment 100, a location and a bearing of user equipment 100, acceleration and deceleration of user equipment 100, or physical contact with or proximity to a user. Based on the detected status of user equipment 100, sensing unit 135 may generate a sensing signal to control the operation of user equipment 100. For example, in the case of a mobile phone having a sliding type cover, sensing unit 135 may sense whether a cover is opened or closed. Sensing unit 135 may sense whether or not power supply 190 supplies power. Furthermore, sensing unit 135 may sense whether or not port unit 170 is coupled to external device 200. In this case, sensing unit 135 may receive a detection signal from port unit 170 when user equipment 100 is connected to external device 200 in accordance with an embodiment of the present invention. For example, sensing unit 135 may receive a detection signal from a hot plug detect (HPD) pin when port unit 170 includes a HDMI port. Based on the detection signal, controller 180 may determine that external device 200 is connected to user equipment 100.

Video processing unit 140 may process an image signal and/or image data under the control of controller 180. Particularly, video processing unit 140 may process image data according to a display setting determined based on display unit information of display unit 160. The display setting may include a screen size, a screen resolution, a display direction, and a dot per inch (DPI) value. The display setting may be determined by controller 180 based on display unit information of display unit 160. The display unit information may include a manufacturer, a model number, a device identifier (ID), a DPI value, a screen size, the number of pixels, supporting screen resolutions, supporting aspect ratios, refresh rates, and a response time. Video processing unit 140 may transmit the processed image data to display unit 160 of user equipment 100 in response to controller 180. Furthermore, video processing unit 140 may process image data to be transmitted to external device 200 when user equipment 100 is connected to external device 200. For example, video processing unit 140 may, reconfigure image data based on a display setting of external device 200 and generate a signal based on the reconfigured image data in response to controller 180. The present invention, however, is not limited thereto. Such an operation may be performed by controller 180. The image data may be data for displaying a graphic user interface produced by any software programs installed in user equipment 100, such as an operating system and applications installed in user equipment 100.

Internal memory 150 and external memory 155 may be used as a data storage device of user equipment 100. For example, internal memory 150 and external memory 155 may store information necessary for operating user equipment 100 and performing certain operations requested by a user. Such information may include any software programs and related data. For example, internal memory 150 and external memory 155 may store an operation system data, applications, and related data, received from an external device through a physical cable and downloaded from a related server from through a communication link. In accordance with at least one embodiment of the present invention, internal memory 150 and/or external memory 155 may store information on display setting determined for display unit 160 or display unit 210 of external device 200. Furthermore, internal memory 150 and external memory 155 may store device unit information for candidate external devices connectable to user equipment 100. In addition, internal memory 150 and/or external memory 150 may store a DPI table (not shown). Internal memory 150 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto. External memory 155 may be a SD card or a USB memory, but the present invention is not limited thereto. For example, external device 200 may function as external memory 155 when external device 200 is coupled to user equipment 100 in accordance with an embodiment of the present invention.

In accordance with embodiment of the present invention, at least one of internal memory 150 and external memory 155 may store external device information received from the connected external device, for example, external device 200. The external device information may include device type information and universal serial bus (USB) device information. The device type information includes information on a device type of the connected external device and the USB device information may include information on vender identification (VID) and product identification (PID) of the external device.

Further, internal memory 150 and external memory 155 may store a device table and application information. The device table may include device type information mapped to USB device information. The device table may be used to obtain the external device information. The application information may include information on whether an application is required for optimally controlling and driving constituent elements of the external device, an application type, and an address of a server for obtaining the required application. The application information may be used to determine an application required for controlling constituent element of the connected external device such as external device 200.

Furthermore, at least one of internal memory 150 and external memory 155 may store an execution condition (e.g., a standalone execution condition, a disconnected execution condition, and a device-related execution condition) associated with an application installed in user equipment 100, an execution-controlled application table, device information (e.g., external device information, and/or user equipment information) and/or an executable application list. The execution condition, the execution-controlled application table, the device information and/or the executable application list will be described in more detail with reference to FIG. 6 to FIG. 10B.

Display unit 160 may be an output device for visually displaying information. For example, display unit 160 may display image data produced or processed by video processing unit 140 and/or controller 180. Display unit 160 may receive the image data from at least one of video processing unit 140 and controller 180 and display the received image data. The image data may be produced as a result of certain operations performed by any software programs installed in user equipment 100. For example, the image data may be data processed for displaying a graphic user interface produced by an operation system and applications, performed in user equipment 100. The applications may be referred to as "App". Also, the image data may further include still images and moving images, produced or processed by video processing unit 140 and controller 180. For example, display unit 160 may be a liquid crystal display (LCD) panel or an active-matrix organic light-emitting diode (AMOLED) panel, but the present invention is not limited thereto.

In accordance with at least one embodiment of the present invention, display unit 160 may display a graphic user interface for enabling the user to select at least one of applications and to select an execution condition associated with the selected application. Such graphic user interface may be created by controller 180 and video processing unit 140.

Audio output unit 165 may provide an output audio signal that may be produced or processed by controller 180 as a result of operations performed by an operating system and/or applications installed in user equipment 100. Audio output unit 165 may include a speaker, a receiver, and a buzzer.

Port unit 170 may include at least one port for exchanging signals and/or data with external device 200. In accordance with an embodiment of the present invention, port unit 170 may transfer image data and audio data from user equipment 100 to external device 200. Port unit 170 may exchange control data with external device 200. Port unit 170 may be coupled to corresponding port unit 250 of external device 200 in various coupling manners. For example, port unit 170 may be coupled to corresponding port unit 250 of external device 200 through a physical cable. Furthermore, port unit 170 may be directly interlocked with corresponding port unit 250 of external device 200. The present invention, however, is not limited thereto. Port unit 170 may be coupled to corresponding port unit 250 of external device 200 through a radio link formed between user equipment 100 and external device 200. In this case, port unit 170 and port unit 250 may include a wireless signal transmitter and receiver (not shown) for communicating with each other using a predetermined communication protocol. Such communication protocol may be Bluetooth® or WiFi, for example, but the present invention is not limited thereto.

As shown in FIG. 4, port unit 170 may include video input/output port 172, audio input/output port 174, and data input/output port 176, but the present invention is not limited thereto. Such port unit 170 may be embodied in various types. For example, port unit 170 may not include audio input/output interface 174. Further, port unit 170 may include a power port (not shown). In this case, the power port may transfer power from external device 200 to user equipment 100 when external device 200 is coupled to user equipment 100.

In accordance with at least one embodiment of the present invention, user equipment 100 may be coupled to external device 200 through port unit 170. After user equipment 100 coupled to external device 200, user equipment 100 may control external device 200 by exchanging data with external device 200 through port unit 170. For example, user equipment 100 may receive inputs from a user through external device 170 and transmit control data to external device 170 through port unit 170. Particularly, user equipment 100 may transmit image data through port unit 170 to external device 200 and control external device 200 to display the image data such a graphic user interface instead of display unit 160 of user equipment 100. Furthermore, user equipment 100 may transmit, through port unit 160, operation results of an application tailored for optimally controlling and driving constituent elements of connected external device 200.

Controller 180 may control overall operation of the constituent elements of user equipment 100. Particularly, controller 180 may perform operations necessary for driving the constituent elements of user equipment 100 in response to inputs received from a related user. Controller 180 may control overall operation of constituent elements of external device 200 when user equipment 100 is connected to external device 200. For example, controller 180 may receive inputs through external device 200, perform an operation in response to the received inputs, and provide the user with the result thereof through external device 200. Particularly, controller 180 may display image data, as a result of operation related to the user inputs, on a display unit of external device 200 when user equipment 100 is connected to external device 200.

In order to control external device 200 when user equipment 100 is connected to external device 200, controller 180 may include agent 182. Agent 182 may control operations related to connection to external device 200 and controlling external device 200. Such agent 182 may be referred to as a coupling agent or a docking agent, but the present invention is not limited thereto. Agent 182 may be implemented in software. For example, agent 182 may be realized on an application layer in an operating system (OS) structure of user equipment 100. For example, such an OS structure may be an OS structure of an Android operating system, but present invention is not limited thereto.

In at least one embodiment of the present invention, controller 180 may include application control unit 184. Application control unit 184 may control the execution of an application and the display of icons associated with applications installed in user equipment 100 based on a connection state between user equipment 100 and external device 200 and at least one execution condition associated with the installed application. Sensing unit 135 may sense whether user equipment 100 is connected to external device 200.

More, application control unit 184 may include execution control unit 1841 and user interface (UI) control unit 1842. When a user request for executing an installed application is received, execution control unit 1841 may obtain the execution condition associated with the requested application and control the execution of the application based on the obtained execution condition and the connection state between user equipment 100 and external device 200. UI control unit 1842 may obtain an execution condition associated with the installed application and determine an executable application based on the execution condition and the connection state between user equipment 100 and external device 200. Execution control unit 1841 will be described in more detail with reference to FIG. 6 to FIG. 8.

UI control unit 1842 may display an icon associated with the determined executable application, through a corresponding device (i.e., user equipment 100 or external device 200) determined according to the connection status between user equipment 100 and external device 200. UI control unit 1842 will be described in more detail with reference to FIG. 6 and FIG. 9 to FIG. 10B.

Figure 5:
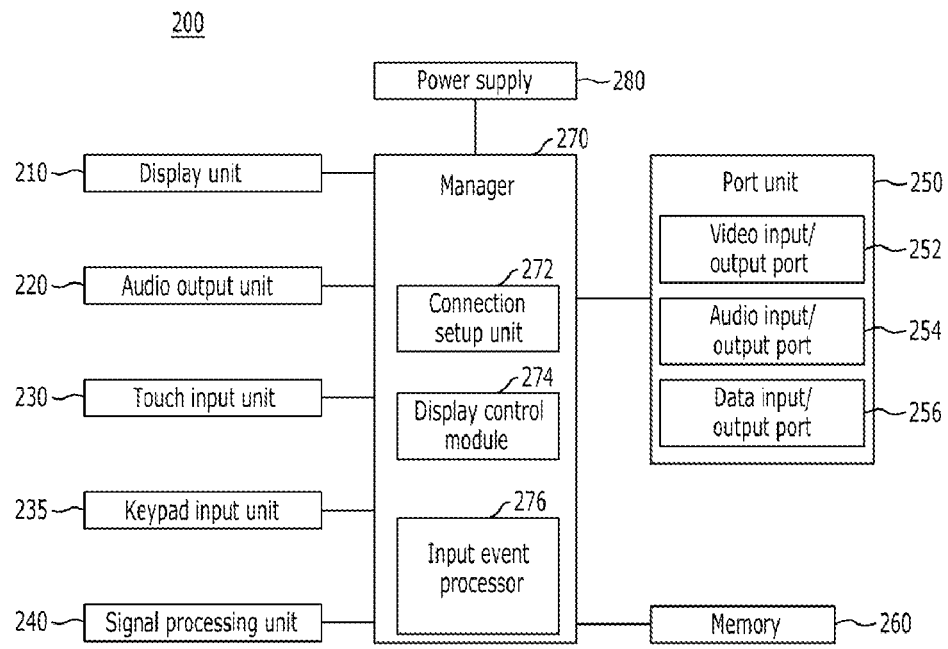
FIG. 5 is a block diagram illustrating an external device in accordance with at least one embodiment of the present invention.

FIG. 5 is a block diagram illustrating an external device in accordance with at least one embodiment of the present invention.

Referring to FIG. 5, external device 200 may include display unit 210, audio output unit 220, touch input unit 230, keypad input unit 235, signal processing unit 240, port unit 250, memory unit 260, manager 270, and power supply 280. Display unit 210, audio output unit 220, touch input unit 230, keypad input unit 235, memory unit 260, and power supply unit 280 may be analogous to, and perform similar functions to, display unit 160, audio output unit 165, input unit 130, internal memory unit 150, and power supply unit 190 of user equipment 100. Accordingly, the detailed description thereof will be omitted herein. For convenience and ease of understanding, only constituent elements performing distinct operations are described.

Port unit 250 may be connected to port unit 170 of user equipment 100. That is, port unit 250 may be a connecting port for forming connectivity between user equipment 100 and external device 200. Accordingly, port unit 250 may be a pair relation with port unit 170 of user equipment 100. Port unit 250 may have the same interface configuration of that of port unit 170 of user equipment 100. For example, port unit 250 may have a HDMI port, a USB port, and an audio port.

Port unit 250 may include video input/output port 252, audio input/output port 254, and data input/output port 256. Video input/output port 252 may receive image data from user equipment 100. Audio input/output port 254 may receive audio signals. Data input/output port 256 may exchange data with user equipment 100. Furthermore, port unit 250 may include a power port (not shown) for transferring power to user equipment 100 and a sensing port (not shown) for sensing connection formed between user equipment 100 and external device 200. The present invention, however, is not limited thereto. For example, port unit 250 may be connected to user equipment 100 through a radio link formed between user equipment 100 and external device 200. In this case, port unit 250 may include a signal transmitter and receiver (not shown) for communicating with each other using a communication protocol. Such communication protocol may be Bluetooth® or WiFi, for example, but the present invention is not limited thereto.

Referring back to FIG. 2, external device 200 may include coupling bay 251 in accordance with at least one embodiment of the present invention. Port unit 250 may be disposed on one side of coupling bay 251. Coupling bay 251 may be formed at a part of a rear side of external device 200. Coupling bay 215 may have a space for housing user equipment 100. User equipment 100 may be inserted into coupling bay 215. In accordance with at least one embodiment of the present invention, port unit 170 of user equipment 100 may be connected with port unit 250 of user equipment 200 when user equipment 100 is completely inserted into coupling bay 251.

Manager 270 may control overall operation for controlling constituent elements of external device 200 in response to user equipment 100 when external device 200 is coupled to user equipment 100. In accordance with at least one embodiment of the present invention, manager 270 may receive control data from user equipment 200 through port unit 250 and perform operation in response to the control data. Further, manager 270 may receive inputs from a related user and transmit the received input to user equipment 100 through port 250.

Furthermore, manager 270 may provide external device information to user equipment 100 when external device 200 is connected to user equipment 100. The external device information may include at least one of device type information and USB device information. User equipment 100 may identify a device type of external device 200 based on the external device information and run an application determined based on the device type of external device 200. Such application may produce operation results optimized for constituent elements of external device 200. Manager 270 may receive such operation results from user equipment 100 and control constituent elements of external device 200 based on the received operation results in accordance with embodiments of the present invention. Furthermore, manager 270 may control related constituent elements to output the received operation results in accordance with embodiments of the present invention.

Manager 270 may include connection setup unit 272, display control module 274, and input event processor 276 in accordance with at least one embodiment of the present invention. Connection setup unit 272 may activate the constituent elements of external device 200 when external device 200 initially senses that external device 200 is connected to user equipment 100. For example, connection setup unit 272 may supply power to the constituent elements of external device 200. That is, connection setup unit 272 may transit a waiting state of external device 200 to a wakeup state of external device 200. Accordingly, connection setup unit 272 may establish a host-device connection between user equipment 100 and external device 200.

External device 200 may provide a graphic user interface substantially identical to that displayed on user equipment 100 when external device 200 is connected to user equipment 100. In such a connected state, image data displayed on display unit 160 of user equipment 100 may be transferred to and displayed on display unit 210 of external device 200. In order to display the transferred image data on display unit 210, manager 270 may include display control module 274. Display control module 274 may turn on display unit 210 under control of manager 270 when external device 200 is connected to user equipment 100. Then, manager 274 may receive the image data displayed on display unit 160 of user equipment 100 from user equipment 100 and display the received image data on display unit 210 of external device 200.

When external device 200 receive input events such as a touch input in a connected state through touch input unit 230 and keypad input unit 235, input event processing unit 276 may generate an event signal corresponding to the input events and transfer the generated event signal to user equipment 100. The generated event signal may be a signal for controlling operation of user equipment 100 corresponding to the received input events.

In accordance with an embodiment of the present invention, external device 200 may not operate in a disconnected status. The disconnected status may denote that user equipment 100 is not connected to external device 200. Accordingly, external device 200 may be a dummy device. In this case, external device 200 may include minimum elements for performing essential functions such as display control and touch input control. The present invention, however, is not limited thereto. External device 200 may be embodied as an independent device installed with an operating system (OS) that allows external device 200 operating in a stand-alone device. For example, external device 200 may operate as a moving image player or a MP3 player when external device 200 is not coupled to user equipment 100. When external device 200 is coupled to user equipment 100, external device 200 may perform certain operations of user equipment 100 in response to the control of user equipment 100 in accordance with at least one embodiment of the present invention.

As described, user equipment may control the execution of an application according to an associated execution condition and a connection state of the user equipment in accordance with at least one embodiment of the present invention. For example, user equipment may allow or restrict the execution of an application based on an associated execution condition and a connection state between the user equipment and an external device. Such operation will be described in detail with reference to FIG. 6 to FIG. 10B. Before describing the operation, a method for setting an execution condition for respective applications will be described with reference to FIG. 6.

Figure 6:
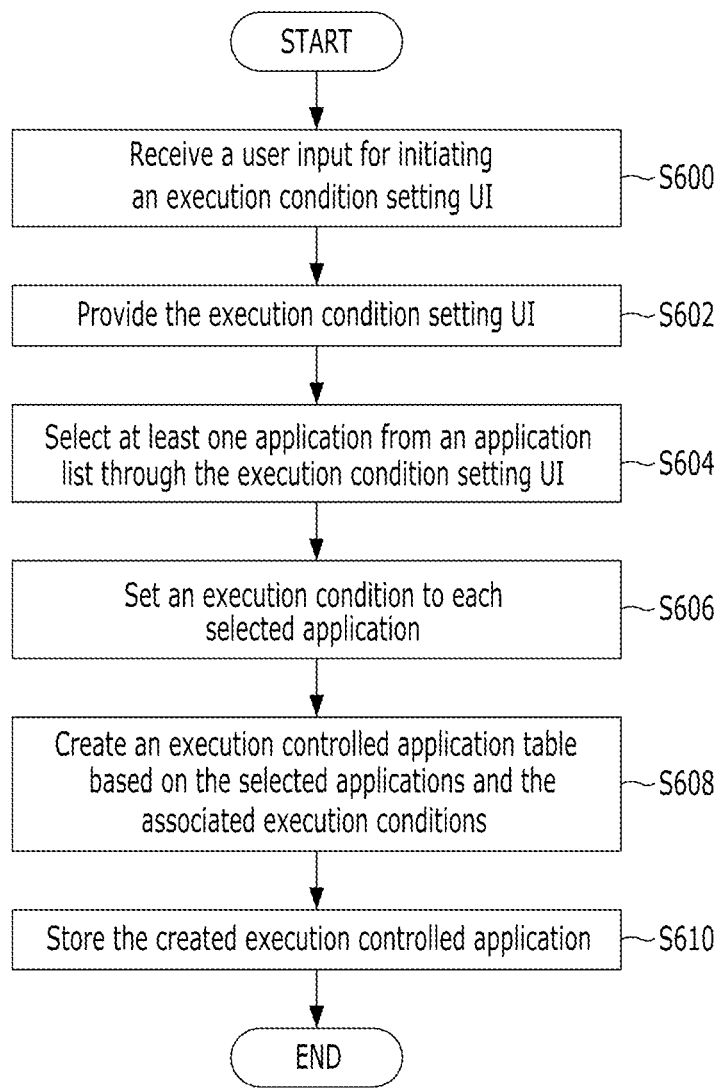
FIG. 6 shows a method for setting an execution condition for respective applications in accordance with at least one embodiment of the present invention.

FIG. 6 shows a method for setting an execution condition for respective applications in accordance with at least one embodiment of the present invention.

Referring to FIG. 6, user equipment 100 may receive a user input for initiating a user interface (UI) for setting an execution condition of respective applications at step S600. For example, a user may make a user input through at least one of a key pad and a touch screen in order to initiate such an execution condition setting UI. Particularly, a user may press a designated key on a key pad of input unit 130 for initiating the execution condition setting UI. The designated key may be at least one of a direction key, a number key mapped to a movement direction, a menu key, a power switch key, a volume control key, and so forth. Furthermore, in order to initiate the execution condition setting UI, a user may make a touch input on a predetermined icon and/or a predetermined menu bar displayed with a default graphic user interface of user equipment 100, such as a home screen. The present invention, however, is not limited thereto. A user may initiate the execution condition setting UI through various methods.

The execution condition may denote a condition for allowing or restricting execution of a corresponding application according to a connection state of user equipment 100. A user may be enabled to set an execution condition of respective application through the execution condition setting UI in accordance with at least one embodiment of the present invention.

At step S602, in response to the initiation user input, user equipment 100 may provide the execution condition setting UI. For example, the execution condition setting UI may enable a user to select a desired application to be controlled among a plurality of applications installed in user equipment 100 and to set a corresponding execution condition of the selected application. At first, the execution condition setting UI may provide a list of applications installed in user equipment 100. Such an application list may include application information on each application installed in user equipment 100. For example, the application information may include information on an application name, a thumbnail image and/or an icon, an installation date, and/or description of each application.

At step S604, at least one desired application may be selected from the provided application list through the provided execution condition setting UI. For example, a user may select at least one from the provided application list for setting an associated execution condition. User equipment 100 may set the selected at least one application as an execution-controlled application in accordance with at least one embodiment of the present invention. When a user selects a plurality of applications as an execution-controlled application, user equipment 100 may store and manage the plurality of selected application in a form of an execution-controlled application list or an execution-controlled application table.

At step S606, the selected application may be set with a desired execution condition. As described, the execution condition may denote a condition for executing an application according to a connection state of user equipment 100 in accordance with at least one embodiment of the present invention. For example, the execution condition may include i) a connected execution condition and ii) a standalone execution condition.

The connected execution condition may be set to an application that may be required to be executed through an external device coupled to user equipment 100. Accordingly, an application set with the connected execution condition may be restricted from execution when user equipment 100 is not coupled to an external device. That is, when user equipment 100 operates as a standalone state, the application set with the connected execution condition is restricted from execution.

The standalone execution condition may be set to an application that may be required to be executed in user equipment 100 in the standalone state. Accordingly, an application set with the standalone execution condition may be restricted from execution when user equipment 100 is coupled to an external device although a user activates the application set with the standalone execution condition. The application set with the standalone execution condition may be executed when user equipment 100 is not coupled to the external device.

As described, the execution condition may be set for executing an application according to a connection state between user equipment 100 and an external device. Furthermore, the execution condition may be set for restricting an application from execution according to a connection state between user equipment 100 and an external device.

As described, the execution condition setting UI may enable a user to set one of the connected execution condition and the standalone execution condition to the selected application in accordance with at least one embodiment of the present invention. The present invention, however, is not limited thereto. For example, each one of the selected application may be set with a device-related execution condition as an execution condition in accordance with another embodiment of the present invention. The device-related execution condition may be at least one of a device type, a device identifier, a screen size, and/or a screen resolution. An application set with the device-related execution condition may be executed only when user equipment 100 is coupled to an external device matched with the device-related execution condition. For example, when an application is set with a predetermined device type, such application may be executed only when user equipment 100 is coupled to an external device having the predetermined device type set as the execution condition.

As described above, the execution condition may include at least one of a connected execution condition, a standalone execution condition, and a device-related execution condition in accordance with at least one embodiment of the present invention. Such execution condition is described as being selected by a user through the execution condition setting UI, but the present invention is not limited thereto. For example, user equipment 100 may determine a proper execution condition for each selected application and set the determined proper execution condition to each selected application in accordance with another embodiment of the present invention. User equipment 100 may refer an installation file of an application to determine the proper execution condition thereof. The installation file may include information on a proper execution condition because such information on a proper execution condition may be set by one of a user and a manufacturer and included in the installation file of an application. In addition, an execution condition may include application level information. Furthermore, the standalone execution condition may be referred to as an independent execution condition and the connected execution condition may be referred to as a docking execution condition. For convenience and ease of understanding, the execution condition will be described as one of the standalone execution condition and the connected execution condition hereinafter.

At step S608, user equipment 100 may create an execution-controlled application table based on the selected applications and the associated execution conditions. For example, the selected applications may be mapped to the associated execution conditions in the created execution-controlled application table. At step S610, user equipment 100 may store the created execution-controlled application table in a memory. For example, the execution-controlled application table may be stored in internal memory 150 and/or external memory 155.

Based on the execution-controlled application table, user equipment 100 may control each application installed therein based on the execution-controlled application table and a connection state between user equipment 100 and an external device in accordance with at least one embodiment of the present invention. Such operation will be described with reference to FIG. 7 to FIG. 8.

Figure 7:
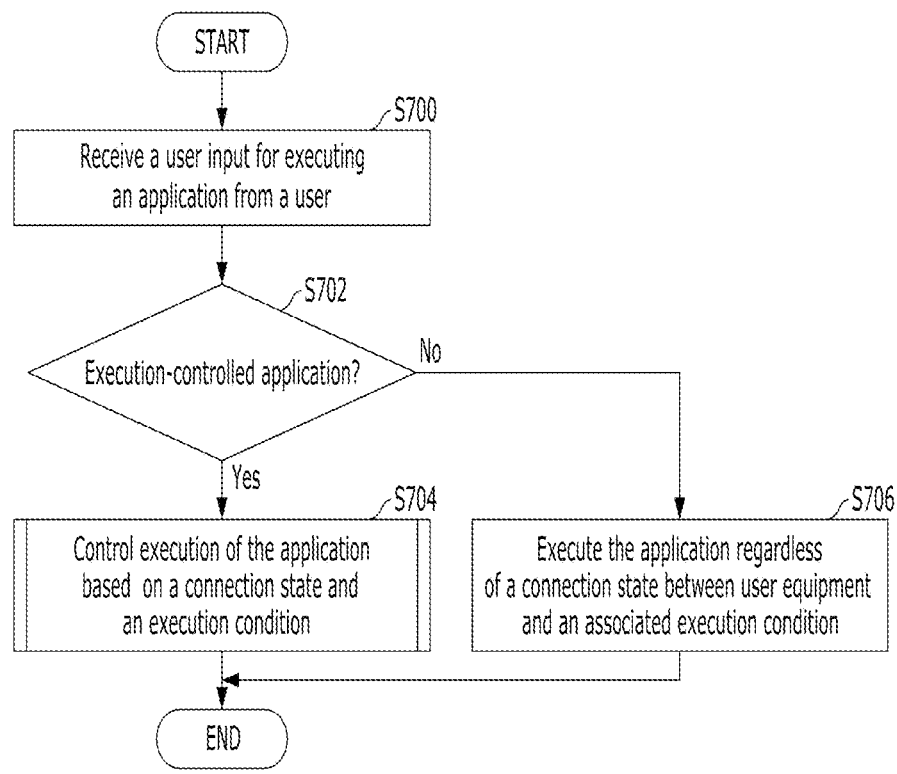
FIG. 7 shows a method for controlling execution of an application in accordance with at least one embodiment of the present invention.

FIG. 7 shows a method for controlling execution of an application in accordance with at least one embodiment of the present invention.

Referring to FIG. 7, user equipment 100 may receive a user input (i.e., an execution request) for executing an application from a user at step S700. For example, a user may activate an icon of a desired application, which is displayed with a default graphic user interface of user equipment 100.

At step S702, user equipment 100 may determine whether the application associated with the user input is an execution-controlled application. For example, user equipment 100 may determine whether the activated application is included in the execution-controlled application table. When the application is included in the execution-controlled application table, user equipment 100 may recognize the application as an execution-controlled application. Otherwise, user equipment 100 may determine that the activated application is not an execution-controlled application.

When the application is the execution-controlled application (Yes—S702), user equipment 100 may control execution of the application at step S704. For example, user equipment 100 may control the execution of the application based on a connection state between user equipment 100 and an external device and an execution condition associated with the application. Such control operation will be described in more detail with reference to FIG. 8.

When the application is not the execution-controlled application (No—S702), user equipment 100 may execute the application regardless of a connection state of user equipment 100 at step S706. For example, user equipment 100 may execute the activated application regardless of whether user equipment 100 is coupled to external device 200. That is, when user equipment 100 is not coupled to external device 200, user equipment 100 may perform the activated application and display image data on display unit 160 of user equipment 100 as a result of performing the application. When user equipment is coupled to external device 200, user equipment 100 may perform the activated application and display produced image data on display unit 260 of the coupled external device 200.

As described, when the activated application is included in the execution-controlled application table, user equipment 100 may control the execution of such application according to the associated execution condition and the connection state of user equipment 100 in accordance with at least one embodiment of the present invention. Such operation will be described with reference to FIG. 8.

Figure 8:
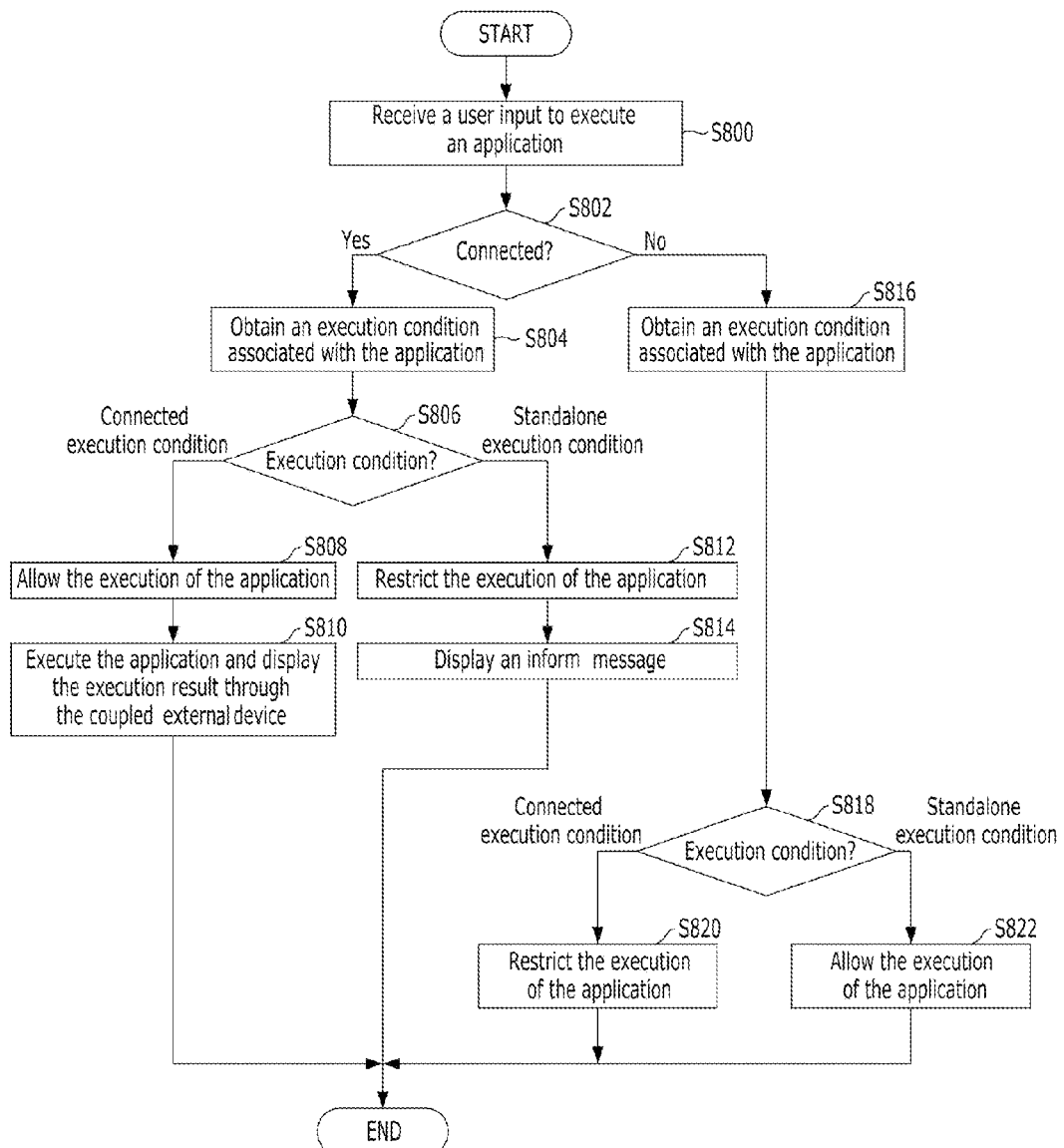
FIG. 8 shows a method for controlling the execution of an application based on a connection state between user equipment and an external device and an execution condition associated with the application in accordance with at least one embodiment of the present invention.

FIG. 8 shows a method for controlling the execution of an application based on a connection state between user equipment and an external device and an execution condition associated with the application in accordance with at least one embodiment of the present invention. Particularly, FIG. 8 shows performing the application execution control procedure (S704) in user terminal 100.

Referring to FIG. 8, user equipment 100 may receive a user input to execute an application at step S800. Upon the receipt of the user input, user equipment 100 may determine whether user equipment 100 is coupled to an external device at step S802. For example, when user equipment 100 is directly coupled to external device 200, port unit 170 of user equipment 100 may be coupled to corresponding port unit 250 of external device 200. In this case, user equipment 100 may detect such physical connection to external device 200 based on a detection signal generated at port unit 170 of user equipment 100. The present invention, however, is not limited thereto. User equipment 100 may detect a connection to external device 200 based on communications with external device 200. In addition, user equipment 100 may detect a connection to external device 200 by exchanging a request message and a response message through a wireless link.

When user equipment 100 is determined as being coupled to external device 200 (Yes—S802), user equipment 100 may obtain an execution condition (e.g., a connected execution condition or a standalone execution condition) of the application at step S804. For example, user equipment 100 may retrieve information on the execution condition associated with the activated application from an execution-controlled application table.

When an execution condition of the application is a connected execution condition (Connected execution condition—S806), user equipment 100 may allow the execution of the application at step S808. User equipment 100 may execute the application and transfer an execution result (e.g., image data) of the application to external device 200 at step S810. Accordingly, the execution result of the application may be displayed through external device 200.

Alternatively, user equipment 100 may control external device 200 to execute a corresponding application if external device 200 includes a central processing unit (CPU) and a memory for executing the application. For example, external device 200 may perform an arithmetic process and a data processing which are necessary to execute the corresponding application and display an execution result through display unit 210.

When an execution condition of the application is a stand-alone execution condition (standalone execution condition—S806), user equipment 100 may restrict the execution of the application at step S812. User equipment 100 may display a message indicating that a corresponding application is restricted from execution, through display unit 160 at step S814.

Alternatively, user equipment 100 may execute the application but control the coupled external device not to display the execution result of the application. That is, user equipment 100 may perform the application in a background mode and not transfer the execution result (e.g., image data) to the coupled external device.

When user equipment 100 is not coupled to external device 200 (No—S802), user equipment 100 may obtain an execution condition of the application at step S816. As described, such an execution condition associated with the application may be retrieved from the execution-controlled application table stored in a memory of user equipment 100.

When the obtained execution condition of the application is a connected execution condition (connected execution control S818), user equipment 100 may restrict the execution of the application at step S820. For example, user equipment 100 may not respond to a user input (i.e., an execution request) for executing an application. Further, user equipment 100 may display a message indicating that a corresponding application is not capable of being executed, through display unit 160.

When the obtained execution condition of the application is a stand-alone execution condition (standalone execution condition-S818), user equipment 100 may allow the execution of the application at step S822.

In at least one embodiment of the present invention, the execution-controlled application table may include information on applications associated with a device-related execution condition such as a device type, a device identifier, a screen size, and/or a screen resolution. In this case, user equipment 100 may control an execution of the application based on a connection state between user equipment 100 and an external device and a device related execution condition. For example, it is assumed that a first application is set to a minimum screen size of about 10 inches as a device-related execution condition. When user equipment 100 is coupled to external device 200 with about 7-inch screen, the first application may be restricted from execution because a corresponding device-related execution condition is not satisfied.

Based on the connection state between user equipment and an external device and the execution control associated with an application, the application may be controlled when the application is selected for execution as shown in FIG. 8 in accordance with at least one embodiment of the present invention. The present invention, however, is not limited thereto. For example, execution of an application may be controlled by allowing or retracting the display of an associated icon according to a connection state of user equipment and an execution condition of the application in accordance with another embodiment of the present invention. Such operation will be described in detail with reference to FIG. 9 and FIG. 10.

Figure 9:
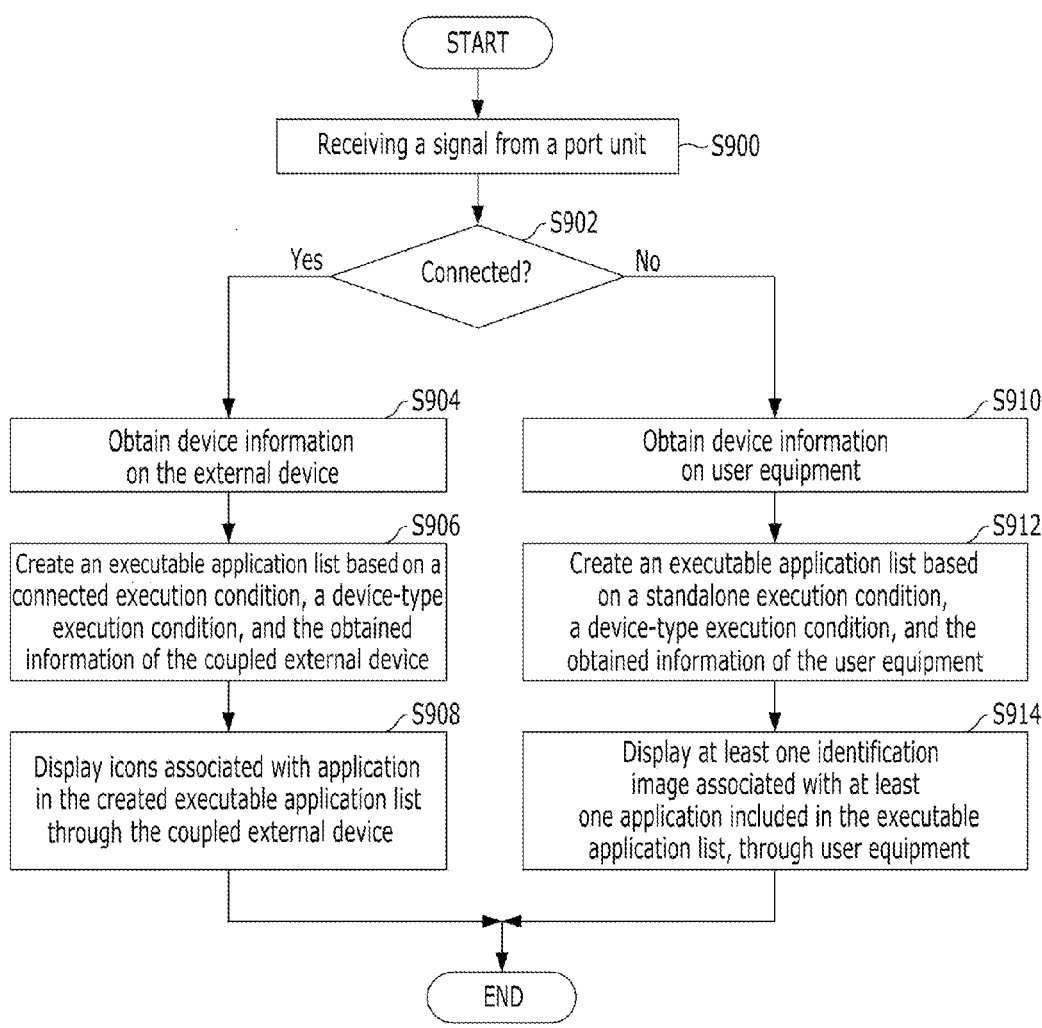
FIG. 9 shows a method for controlling the execution of respective applications by controlling the display of associated application icons in accordance with at least one embodiment of the present invention.

FIG. 9 shows a method for controlling the execution of respective applications by controlling the display of associated application icons in accordance with at least one embodiment of the present invention.

Referring to FIG. 9, user equipment 100 may receive a signal from a port unit or a turn-on signal at step S900. For example, user equipment 100 may receive a connection detection signal or a connection release signal from port unit 170 whenever user equipment 100 is coupled to an external device or user equipment 100 is released from the coupled external device. Furthermore, user equipment 100 may receive a turn-on signal when user equipment 100 is turned on. When user equipment 100 receives a signal from the port unit and the turn-on signal, user equipment 100 may determine whether user equipment 100 is coupled to an external device at step S902.

When user equipment 100 is coupled to external device 200 (Yes-S902), user equipment 100 may obtain device information (i.e., external device information) on external device 200 at step S904. Herein, the external device information may include information associated with external device 200 such as a device type, a device identifier, a screen resolution, and/or a screen size. In at least one embodiment, the external device information may further include USB device information. The USB device information may include a vender ID (VID) and/or a product ID (PID) of a USB device. User equipment 100 may obtain the external device information from external device 200 through communication.

At step S906, user equipment 100 may create an executable application list ("a first executable application list") based on one of a standalone execution condition and a connected execution condition, a device-related execution condition, and the obtained external device information. More specially, user equipment 100 may determine whether execution conditions set to each application installed in user equipment 100 are satisfied to the connection state of the user equipment and the obtained external device information. When the execution conditions are satisfied, a corresponding application may be included in the first executable application list. Accordingly, the first executable application list may include at least one application allowed to be executed when user equipment 100 is coupled to external device 200.

The execution conditions of each application may be determined based on an installation file of a corresponding application. Such installation file may be set with the execution conditions of a corresponding application when the application is installed in user equipment 100. For example, one of a standalone execution condition and a connected execution condition may be selected and set to an application with a device-related execution condition when the application is installed in user equipment 100. In this case, the selected one and the device-related execution condition may be included in the installation file of the application. The device-related execution condition may be a condition associated with one of properties of a device (e.g., user equipment and/or an external device). For example, the device-related execution condition may include a device type, a device identifier, a screen size, and/or a screen resolution.

For example, it is assumed that four applications, such as application "A" to application "D", are installed in user equipment 100. Application "A" is set with a connected execution condition but a minimum screen size of 7 inch as a device-related execution condition. Application "B" is set with a connected execution condition and a minimum screen size of about 10 inches as a device-related execution condition. Application "C" is set with a standalone execution condition but no device-related execution condition. Application "D" is set with a standalone execution condition and a minimum screen size of about 7 inches as a device-related execution condition. When user equipment 100 is connected to external device 200 with about 7-inch screen, application "A" may be included in the first executable application list. However, application "B" to application "D" may be excluded from the first executable application list.

At step S908, user equipment 100 may display icons associated with applications included in the first executable application list, through external device 200. More specifically, user equipment 100 may control external device 200 to display icons of executable applications. In other words, an execution icon corresponding to an application (e.g., application "B" to application "D") excluded from the first executable application list may not be displayed on a screen of external device 200 even though the application (e.g., application "B" to application "D") is installed in user equipment 100.

Meanwhile, when user equipment 100 is not connected to external device 200 (No—S902), user equipment 100 may obtain device information (i.e., user equipment information) on user equipment 100 at step S910. The user equipment information may include information associated with user equipment 100 such as a device type, a device identifier, and/or a screen size.

At step S912, user equipment 100 may create an executable application list ("a second executable application list") based on a connection state (i.e., a disconnected state because user equipment 100 is disconnected from external device 200), execution conditions, and the obtained device information. More specially, user equipment 100 may determine whether one of a standalone execution condition and a disconnected execution condition and a device-related execution condition of each application installed in user equipment 100 are satisfied, based on the connection status (i.e., disconnected state) and the obtained device information (i.e., user equipment information). When the execution conditions are satisfied, a corresponding application may be included in the second executable application list. Accordingly, the second executable application list may include at least one application allowed to be executed in user equipment 100. Since execution conditions were already described, the detailed description thereof is omitted.

For example, in the case that user equipment 100 has about 5-inch screen and is not connected to external device 200, application "C" may be included in the second executable application list. However, application "A", application "B", and application "D" may be excluded from the second executable application list.

In at least one embodiment of the present invention, application "C" may be included in the second executable application list. In this case, an additional processing procedure (e.g., a screen adjustment process) may be performed such that application "C" can be optimally displayed on user equipment 100.

At step S914, user equipment 100 may display an icon associated with at least one application included in the second executable application list, through user equipment 100. In other words, an icon corresponding to an application excluded from the second executable application list may not be displayed on a screen of user equipment 100 even though the application is installed in user equipment 100. For example, with respect to application "A", a corresponding identification image (e.g., an icon) may not be displayed on user equipment 100. When user equipment 100 is connected to external device 200, the corresponding identification image of application "A" may be displayed on user equipment 100.

Figure 10A:
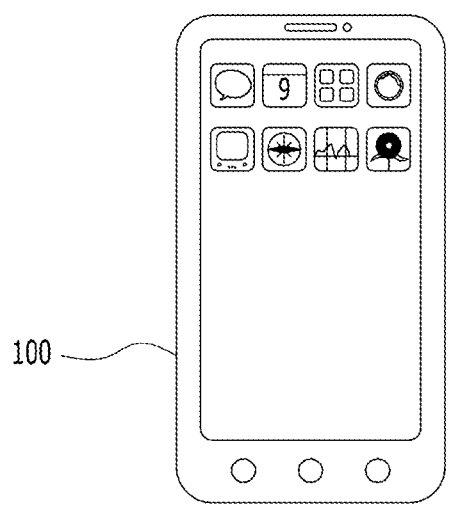
FIG. 10A and FIG. 10B show an example of controlling a display of an application icon in accordance with at least one embodiment of the present invention.
Figure 10B:
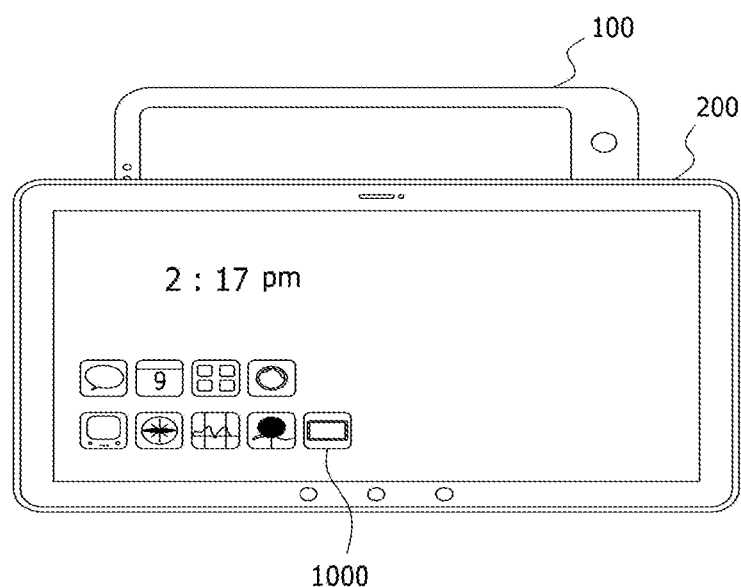

FIG. 10A and FIG. 10B show an example of controlling a display of an application icon in accordance with at least one embodiment of the present invention.

As described above, the display of an application icon may be controlled (e.g., displayed or not displayed) based on a connection state between user equipment 100 and external device 200, associated execution conditions, and device information (e.g., external device information or user equipment information). For example, a navigation application is installed in user equipment 100. The navigation application is set with a connected execution condition. When user equipment 100 is not connected to external device 200, icon 1000 of the navigation application may not be displayed on user equipment 100 as shown in FIG. 10A. That is, when user equipment 100 is disconnected from external device 200, an icon of the navigation application may be not represented on a screen of user equipment 100. In this case, a user may not recognize the presence of the navigation application in a screen of user equipment 100. Accordingly, the navigation application may not be executed since user equipment 100 does not receive a user input (e.g., a touch input) for executing the navigation application from the user. Herein, the navigation application may correspond to application "A" described in FIG. 9.

When user equipment 100 is connected to external device 200, icon 1000 of the navigation application may be displayed on external device 200 as shown in FIG. 10B. In this case, a user may execute the navigation application by making a touch gesture, such as a user finger tap or flick, on icon 1000.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling an application execution in user equipment, the method comprising:
   receiving a user request for executing an application;
   obtaining an execution condition associated with the requested application, wherein the execution condition includes at least one of a standalone execution condition, a connected execution condition, and a device-related execution condition;
   detecting whether the user equipment is connected to an external device; and
   controlling an execution of the requested application based on a connection detection result and the obtained execution condition, wherein when the user equipment is connected to the external device in a powered-on state and the requested application is set with the standalone execution condition,
the controlling includes automatically performing, without receipt of a user input for allowing an application execution control, one of:
(i) restricting the execution of the requested application, and
(ii) allowing the execution of the requested application but restricting a transmission of an execution result of the requested application to the external device.

2. The method of claim 1, further comprising:
setting at least one execution condition associated with at least one application installed in the user equipment.

3. The method of claim 2, wherein the execution condition associated with an application is included in an installation file of the application when the application is installed in the user equipment.

4. The method of claim 1, wherein:
an application set with the standalone execution condition is allowed to be executed when the user equipment is not coupled to the external device;
an application set with the connected execution condition is allowed to be executed when the user equipment is coupled to the external device; and
an application set with the device-related execution condition is allowed to be executed when the device-related execution condition satisfies with at least one property of one of the user equipment and the external device.

5. The method of claim 4, wherein the controlling includes:
controlling the external device to display an execution result of the requested application, when the user equipment is connected to the external device and the requested application is set with the connected execution condition.

6. The method of claim 4, wherein the controlling includes:
restricting execution of the requested application, when the user equipment is disconnected from the external device and the requested application is set with the connected execution condition.

7. The method of claim 4, wherein the controlling includes:
allowing execution of the requested application when the user equipment is disconnected from the external device and the requested application is set with the standalone execution condition.

8. A method of controlling execution of respective applications through controlling display of associated icons, the method comprising:
obtaining execution conditions associated with at least one application installed in user equipment, wherein the execution conditions include at least one of a standalone execution condition, a connected execution condition, and a device-related execution condition;
detecting whether the user equipment is connected to an external device;
determining an executable application based on the obtained execution conditions and a connection detection result; and
displaying an icon associated with the determined executable application automatically without receipt of user input,
wherein in a case of an application set with the connected execution condition,
(i) when the user equipment is connected to the external device,
the application is determined as the executable application; and
the icon associated with the determined executable application is displayed through the external device; and
(ii) when the user equipment is disconnected from the external device,
the icon associated with the application set with the connected execution condition is not displayed on the disconnected user equipment.

9. The method of claim 8, wherein:
an application set with the standalone execution condition is allowed to be executed when the user equipment is not coupled to the external device; and
an application set with the device-related execution condition is allowed to be executed when the device-related execution condition satisfies with at least one property of one of the user equipment and the external device.

10. The method of claim 9, including:
determining the application set with the standalone execution condition as the executable application when the user equipment is disconnected from the external device; and
displaying an icon of the determined executable application on the user equipment.

11. The method of claim 9, wherein the determining further includes:
when device information on at least one of the external device and the user equipment is obtained according to the connection detection result,
determining whether the device-related execution condition is satisfied based on the obtained device information.

12. The method of claim 11, wherein the device information includes at least one of a device type and a screen size.

13. User equipment for controlling execution of an application, the user equipment comprising:
a sensing unit configured to detect whether the user equipment is connected to an external device; and
an application control unit configured to control at least one of (i) execution of an application and (ii) display of an icon of an installed application, based on a connection detection result of the sensing unit and at least one execution condition associated with the installed application,
wherein the execution condition includes at least one of a standalone execution condition, a connected execution condition, and a device-related execution condition;
wherein the application control unit includes an execution control unit configured to:
receive a user request for executing the installed application,
obtain the execution condition associated with the requested application, and
control execution of the application based on the connection detection result and the obtained execution condition; and
wherein when the user equipment is connected to the external device in a powered-on state and the requested application is set with the standalone execution condition, the execution control unit is configured to automatically perform, without receipt of a user input for allowing an application execution control, at least one of:
(i) restricting the execution of the requested application, and
(ii) allowing the execution of the requested application but restricting a transmission of an execution result of the requested application to the external device.

14. The user equipment of claim 13, wherein the application control unit includes a user interface (UI) control unit configured to:
obtain the execution condition associated with the installed application;
determine an executable application based on the obtained execution condition and the connection detection result; and
display an icon associated with the determined executable application, through a corresponding device determined according to the connection detection result.

* * * * *